(12) United States Patent
Yoshikawa et al.

(10) Patent No.: US 10,487,620 B2
(45) Date of Patent: Nov. 26, 2019

(54) METHOD OF EXTRACTING UNDERGROUND RESOURCES AND HYDROLYSIS-BLOCKING AGENT FOR USE IN THE METHOD

(71) Applicant: TOYO SEIKAN GROUP HOLDINGS, LTD., Tokyo (JP)

(72) Inventors: Seishi Yoshikawa, Yokohama (JP); Tsutaki Katayama, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 167 days.

(21) Appl. No.: 15/527,223

(22) PCT Filed: Oct. 22, 2015

(86) PCT No.: PCT/JP2015/079784
§ 371 (c)(1),
(2) Date: May 16, 2017

(87) PCT Pub. No.: WO2016/080142
PCT Pub. Date: May 26, 2016

(65) Prior Publication Data
US 2017/0335653 A1    Nov. 23, 2017

(30) Foreign Application Priority Data
Nov. 19, 2014  (JP) .................. 2014-234406

(51) Int. Cl.
*E21B 43/26* (2006.01)
*E21B 33/13* (2006.01)
(Continued)

(52) U.S. Cl.
CPC .......... *E21B 33/143* (2013.01); *E21B 21/003* (2013.01); *E21B 43/26* (2013.01); *C09K 8/80* (2013.01)

(58) Field of Classification Search
CPC ...... E21B 43/26; E21B 43/267; E21B 33/138; E21B 33/13; C09K 8/80; C09K 8/68
See application file for complete search history.

(56) References Cited

U.S. PATENT DOCUMENTS 7,036,587 B2   5/2006   Munoz, Jr. et al.
7,775,278 B2   8/2010   Willberg et al.
(Continued)

FOREIGN PATENT DOCUMENTS

JP    3-212593 A    9/1991
JP    2009-114448 A   5/2009
(Continued)

OTHER PUBLICATIONS

Communication dated May 24, 2018 from the European Patent Office in counterpart European application No. 15860524.6.
(Continued)

*Primary Examiner* — Zakiya W Bates
(74) *Attorney, Agent, or Firm* — Sughrue Mion, PLLC (57) ABSTRACT

A method of extracting the underground resources by pressurizing a fluid filled in an ore chute in which cracks are formed and by, further, forming or growing the cracks, the underground resources being extracted through the cracks, wherein a hydrolysis-blocking agent is introduced with pressure into the fluid to block a diverting agent that works to temporarily close the cracks.

15 Claims, 4 Drawing Sheets

(51) Int. Cl.
    *E21B 33/14*     (2006.01)
    *E21B 21/00*     (2006.01)
    *C09K 8/80*     (2006.01)

(56) References Cited

U.S. PATENT DOCUMENTS

| | | |
|---|---|---|
| 7,833,950 B2 | 11/2010 | Willberg et al. |
| 2004/0106525 A1 | 6/2004 | Willberg et al. |
| 2006/0113077 A1 | 6/2006 | Willberg et al. |
| 2006/0169450 A1 | 8/2006 | Mang et al. |
| 2008/0070810 A1 | 3/2008 | Mang |
| 2010/0200235 A1 | 8/2010 | Luo et al. |
| 2012/0181035 A1 | 7/2012 | Mang |
| 2013/0252854 A1 | 9/2013 | Abe et al. |
| 2015/0072903 A1 | 3/2015 | Abe et al. |
| 2015/0315891 A1 | 11/2015 | Yoshikawa |

FOREIGN PATENT DOCUMENTS

| | | |
|---|---|---|
| WO | 2010/055903 A1 | 5/2010 |
| WO | 2010/087733 A1 | 8/2010 |
| WO | 2012/050187 A1 | 4/2012 |
| WO | 2012/121294 A1 | 9/2012 |
| WO | 2014/091994 A1 | 6/2014 |

OTHER PUBLICATIONS

International Search Report of PCT/JP2015/079784 dated Jan. 19, 2016.

Fig. 2A
(SIMULTANEOUS FEEDING)

Fig. 2B
(TWO-STEP FEEDING)

METHOD OF EXTRACTING UNDERGROUND RESOURCES AND HYDROLYSIS-BLOCKING AGENT FOR USE IN THE METHOD

CROSS REFERENCE TO RELATED APPLICATIONS

This application is a National Stage of International Application No. PCT/JP2015/079784 filed Oct. 22, 2015, claiming priority based on Japanese Patent Application No. 2014-234406 filed Nov. 19, 2014, the contents of all of which are incorporated herein by reference in their entirety.

TECHNICAL FIELD

This invention relates to a method of extracting the underground resources such as petroleum, natural gases and shale gases by utilizing a hydraulic fracturing method.

BACKGROUND ART

To extract the underground resources, there has now been widely employed a method that is based on the hydraulic fracturing method. According to this method, as also disclosed in a patent document 1, an ore chute formed by drilling using a drilling machine is filled with a fluid. The fluid is then pressurized to form cracks in the ore chute in order to extract the underground resources such as petroleum (oils) and gases through the cracks. This method is also called hydraulic fracturing method, and the fluid used in this method is also called fracturing fluid.

According to this method, cracks that are formed contribute greatly to increase the sectional area of the ore chute in which the resources flow and enable the underground resources to be efficiently extracted. Therefore, this method has been widely employed for extracting, specifically, the shale gases that are produced from the sedimentary rocks that are present in relatively shallow places in the ground.

Here, in the hydraulic fracturing method, a preliminary blasting called perforation is executed in the horizontal ore chute prior to forming the cracks by pressurizing the fluid. Due to the preliminary blasting, there are formed relatively large cracks as well as a number of small cracks deep in the ore chute. Thereafter, the fluid is flown with pressure into the ore chute. Namely, the fluid flows into the cracks thereby exerting load to the cracks; i.e., the cracks grow into sizes large enough for suitably extracting the resources.

By using the fracturing fluid, the hydraulic fracturing method forms the cracks as described above and extracts the resources or gases through the cracks. Here, the hydraulic fracturing method often uses a hydrolysable material to temporarily close the cracks.

For instance, there is often used a diverting agent for temporarily closing part of the cracks that have been formed already. Namely, while closing part of the cracks that have been formed already with the diverting agent, the fluid filled in the ore chute is pressurized. The fluid, therefore, infiltrates into other cracks which then grow large in sizes. Thus a number of large cracks can be effectively formed. As the diverting agent, there is used a hydrolysable material. This is because the diverting agent must undergo the decomposition with the passage of time after it has temporarily closed the cracks.

Patent documents 1 and 2 are disclosing the use of a powder of polylactic acid and a fiber of polylactic acid as the diverting agents. Such diverting agents undergo the hydrolysis and extinguish with the passage of time. Therefore, the diverting agents do not remain in the ground, do not cause environmental contamination and do not, either, hinder the extraction of the resources such as gases and oils.

Further, in order that the cracks are not collapsed by the pressure in the ground, a crack support material is often filled in the cracks that are formed by pressurizing the fluid filled in the ore chute. The crack support material is also called proppant. As the proppant, there is usually used a granular material such as sand or the like. Generally, however, the fluid (fracturing fluid) is used in a state in which proppant particles are dispersed being applied with pressure. Thus proppant particles are forcibly introduced into the cracks that are formed.

A patent document 3 discloses the use of the polylactic acid in a fibrous form as an agent for transporting the proppant Namely, the patent document 3 teaches that the polylactic acid in the fibrous form is also a hydrolysable material which is capable of infiltrating together with the proppant into the cracks and, after the passage of a predetermined period of time, undergoes the hydrolysis and extinguishes without, therefore, remaining in the ground and effectively avoiding the cause of environmental contamination. Further, as the polylactic acid in the fibrous form enters with pressure into the cracks and, thereafter, undergoes the hydrolysis, a channel-like structure is formed in the cracks securing passages for the gases and oils to flow out. It is, therefore, made possible to efficiently extract the resources.

Further, the powder or the fiber of the polylactic acid which is the above-mentioned hydrolysable material is often used as the proppant that is a material for supporting the cracks.

PRIOR ART DOCUMENTS

Patent Documents

Patent document 1: U.S. Pat. No. 7,775,278
Patent document 2: U.S. Pat. No. 7,036,587
Patent document 3: U.S. Pat. No. 7,833,950

OUTLINE OF THE INVENTION

Problems that the Invention is to Solve

In extracting the resources such as gases and oils through the cracks as described above, it often happens that the cracks cannot be formed as desired. That is, gases flow out through the cracks and it became difficult to grow the cracks to a sufficient degree due to the pressure of the gases. Or, as the cracks are formed, the pressure tends to increase due to the gases that flow out causing a problem in that it became difficult to apply the pressure for forming the cracks. Furthermore, leakage of the gases often makes it difficult to conduct the operation for applying the pressure for generating the cracks.

Further, if the cracks that have been formed already are closed by being filled with the diverting agent and the fluid is introduced with pressure into the ore chute in this state, then the fluid flows into the cracks since the cracks have not been closed to a sufficient degree. As a result, the fluid pressure cannot be effectively applied to other portions and, therefore, it becomes difficult to form or grow other cracks. Moreover, the diverting agent is often hydrolyzed unexpectedly and fails to exhibit its effect.

It is, therefore, an object of the present invention to provide a method of extracting the underground resources through the cracks that are formed in the ore chute by using a fluid, the method being capable of suppressing the gases from flowing out of the cracks or suppressing the fluid from flowing into the cracks for a predetermined period of time.

Another object of the present invention is to provide a blocking agent that is used for executing the above-mentioned method of extraction.

Means for Solving the Problems

According to the present invention, there is provided a method of extracting the underground resources by pressurizing a fluid filled in an ore chute in which cracks are formed and by, further, forming or growing the cracks, the underground resources being extracted through the cracks, wherein a hydrolysis-blocking agent is introduced with pressure into the fluid to block a diverting agent that works to temporarily close the cracks.

According to the method of extraction of the present invention, it is desired that:

(a) A hydrolysable resin having a glass transition temperature (Tg) lower than a temperature in an environment of extraction is used as the hydrolysis-blocking agent;
The hydrolysis-blocking agent is introduced together with the diverting agent with pressure into the fluid;
(c) After the cracks have been closed at least partly with the diverting agent, the hydrolysis-blocking agent is introduced with pressure into the fluid;
(d) As the hydrolysis-blocking agent, there is used a hydrolysable resin having a crystallization index ΔHm of not more than 70 J/g, the crystallization index ΔHm being found from a curve of temperature rise measured in the first time by using a DSC and being represented by the following formula (1), $$\Delta Hm = \Delta Hm' - \Delta Hc \quad (1)$$

wherein ΔHm' is a quantity of heat of fusion (J/g) calculated from a peak area of an endothermic peak of fusion, and
ΔHc is a quantity of heat (J/g) calculated from a peak area of an exothermic peak of crystallization;
(e) The hydrolysis-blocking agent is a copolymerized polyoxalate in which a dibasic acid unit other than an oxalic acid has been introduced; and
(f) An aliphatic polyester is used as the hydrolysable material for temporarily closing the cracks.

According to the present invention, further, there is provided a hydrolysis-blocking agent to be added to a dispersion solution for extraction that is filled in an ore chute, the hydrolysis-blocking agent having a crystallization index ΔHm that is found from a curve of temperature rise measured in the first time by using a DSC and is represented by the following formula (1), $$\Delta Hm = \Delta Hm' - \Delta Hc \quad (1)$$

wherein ΔHm' is a quantity of heat of fusion (J/g) calculated from a peak area of an endothermic peak of fusion, and
ΔHc is a quantity of heat (J/g) calculated from a peak area of an exothermic peak of crystallization.

In the above blocking agent, it is desired that the hydrolysable resin is a copolymerized polyoxalate in which a dibasic acid unit other than an oxalic acid has been introduced.

Effects of the Invention

According to the method of extraction of the present invention, cracks are formed in the ore chute by pressurizing the fluid (dispersion solution for extraction) filled in the ore chute, and the underground resources (e.g., shale gases and natural gases) are extracted through the cracks. Here, a particularly important feature resides in the use of a hydrolysis-blocking agent in order to block the hydrolysable diverting agent that is made present so as to close the cracks that have been formed.

As described already, cracks formed in the ore chute are often closed with a granular or fibrous hydrolysable material, and the fluid is introduced with pressure into the ore chute. Therefore, cracks are newly formed or cracks grow further due to the pressure of the fluid. Here, if the cracks are not closed to a sufficient degree, the fluid cannot be effectively pressurized. The fluid then flows into the cracks through gaps in the hydrolysable material, or the gases flow out from the cracks passing through the gaps, impairing the application of pressure by the fluid. Further, if the hydrolysable material is hydrolyzed unexpectedly, then the cracks once closed are caused to open.

According to the present invention, however, the hydrolysable diverting agent (granular or fibrous) closing the cracks is blocked with the above blocking agent, particles of the diverting agent are firmly bonded together, the gaps in the diverting agent are effectively closed, the fluid is effectively suppressed from flowing into the cracks or the gases are effectively suppressed from flowing out through the cracks, the pressure is effectively applied by the fluid, and the cracks necessary for extracting the resources can be much formed in the ore chute. Further, with the particles of the diverting agent being blocked, the diverting agent acquires a decreased surface area that comes in contact with water, and is suppressed from undergoing the hydrolysis unexpectedly. Therefore, the delay effect due to the blocking agent can be expected.

Moreover, owing to its hydrolysable capability, the blocking agent, after the passage of a predetermined period of time, undergoes the hydrolysis together with the hydrolysable material and extinguishes. Therefore, the cracks are opened and the resources can be effectively extracted through the cracks. There arises no problem of environmental contamination, either, that is caused by the remaining blocking agent.

MODES FOR CARRYING OUT THE INVENTION

<Principle of Preventing the Gases from Flowing Out>

Figure 1A:
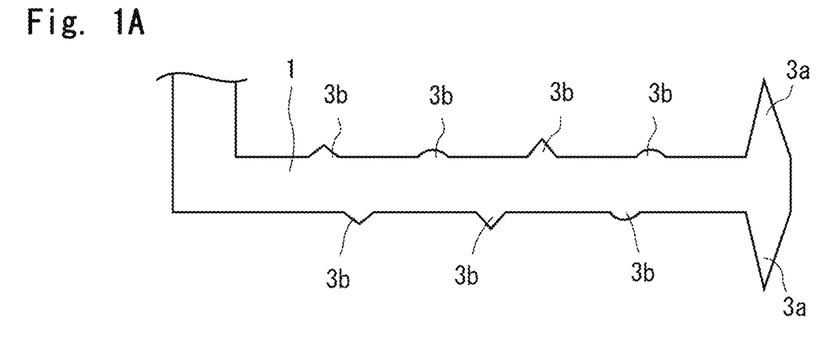
FIG. 1A and FIG. 1B are diagrams illustrating the principle of the present invention.
Figure 1B:
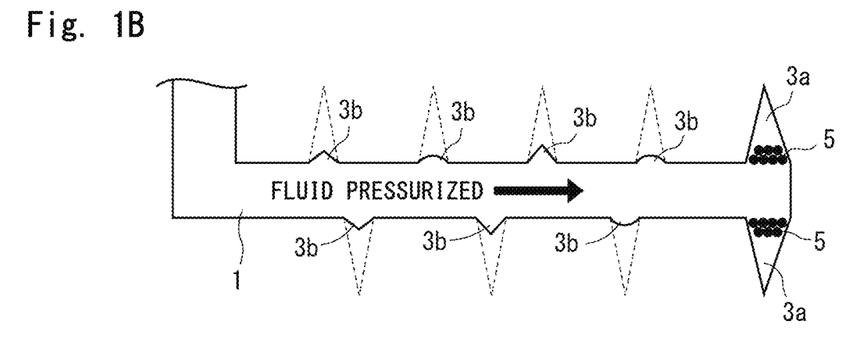

In extracting the resources by using a fluid (fracturing fluid) as shown in FIGS. 1A and 1B, a preliminary blasting (perforation) is executed deep in an ore chute 1 that is drilled by using a drilling machine and is extending in a horizontal direction. Due to the preliminary blasting (perforation), therefore, there are formed large cracks 3a and small cracks 3b (see FIG. 1A).

Though the large cracks 3a can be readily used for extracting the resources, their number is small. Therefore, the large cracks 3a only are not enough for efficiently extracting the resources in large amounts. The operation, therefore, is conducted to form larger cracks.

To form more cracks, usually, the above cracks 3a are once closed and the fluid (fracturing fluid) is introduced with pressure into the ore chute. Without closing the cracks 3a, the fluid that is introduced with pressure flows into large cracks 3a, and the pressure of the fluid is not effectively applied to other portions. Besides, the gas which is the resource often flows out through the cracks 3a; i.e., the pressure of the gas impairs the attempt of introducing the fluid with pressure. To prevent these problems, the cracks 3a must be closed for a while at the time of introducing the fluid with pressure.

To close the cracks 3a for a while, a diverting agent 5 is used. As the diverting agent 5, there is used a powder or a fiber of a highly crystalline hydrolysable resin such as polylactic acid, polyoxalate or polyglycolic acid. The diverting agent 5 is, usually, added to the fluid that is introduced with pressure into the ore chute. As the fluid is introduced with pressure, the diverting agent 5 infiltrates into the large cracks 3a and closes the large cracks 3a (see FIG. 1B).

With the cracks 3a being closed as described above, the pressurized fluid is prevented from flowing into the cracks 3a and the gas is prevented from flowing out through the cracks 3a. By continuing the introduction of the fluid with pressure, therefore, the pressure of the fluid effectively acts on the portions other than the large cracks 3a. For instance, a large pressure of fluid is applied to the small cracks 3b initially formed by the preliminary blasting, and the cracks 3b grow into large cracks. Thus, there can be formed the cracks 3a of sizes suited for extracting the resources throughout the whole ore chute 1.

Moreover, the diverting agent 5 is hydrolysable and, therefore, undergoes the hydrolysis with the passage of time and extinguishes. Therefore; the cracks 3a are closed only temporarily and are opened after the passage of a predetermined period of time. Resources can, therefore, be extracted through the cracks 3a.

The large cracks 3a that are formed in a lot of number as described above can be, further, closed by feeding the diverting agent 5 thereto. Thereafter, the fluid is introduced again with pressure, thereby to form a further increased number of cracks 3a.

In the work for forming the cracks 3a as described above, it is ideal if the large cracks 3a formed in the first time have been effectively closed. In practice, however, gaps are present among the particles of the diverting agent 5. Therefore, it is not possible to completely prevent the fluid from flowing into the cracks 3a or to prevent the gas from flowing out through the cracks 3a. Due to unexpected decomposition of the diverting agent 5, further, the cracks 3a cannot be closed for a predetermined period of time.

Figure 2A:
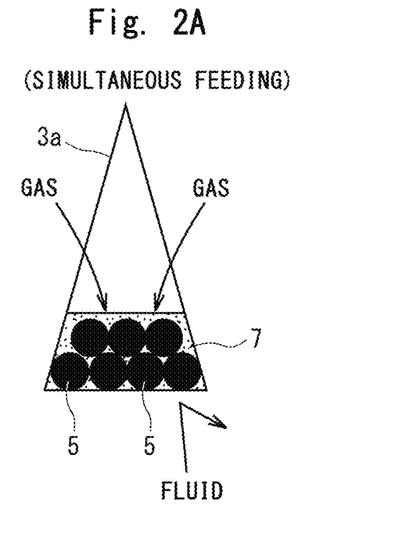
FIG. 2A and FIG. 2B are diagrams illustrating the effects of the blocking agent used in the present invention.
Figure 2B:
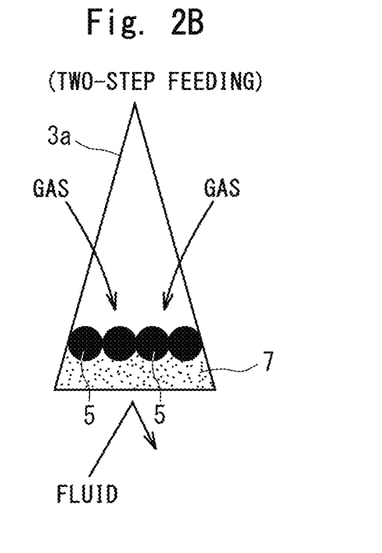

Therefore, the present invention uses, as the blocking agent, a hydrolysable material that is capable of blocking the diverting agent 5. As shown in FIGS. 2A and 2B, the blocking agent 7 that is used works to seal the gaps among the particles of the diverting agent 5, works to firmly fix the particles and, therefore, works to reliably suppress the fluid from flowing into the cracks 3a or to suppress the gas from flowing out through the cracks 3a. There is, further, exhibited an effect of delaying the decomposition of the diverting agent 5 permitting the cracks 3a to remain closed for a predetermined period of time.

As for feeding the hydrolysable blocking agent 7, there can be employed either a means for feeding the blocking agent 7 to the fracturing fluid that has been filled in the ore chute being mixed with the particles of the diverting agent 5 (simultaneous feeding, see FIG. 2A) or a means for introducing with pressure the fracturing fluid to which the diverting agent 5 has been added to close the large cracks 3a and, thereafter, introducing with pressure the blocking agent 7 to the fracturing fluid (2-step feeding, see FIG. 2B).

In the case of the simultaneous feeding shown in FIG. 2A, the diverting agent 5 is pushed into the cracks 3a together with the blocking agent 7.

Here, the cracks 3a are formed deep under the ground where there are resources, and the environmental temperature therein is high depending on the depth. Therefore, the hydrolysable blocking agent 7 used in the present invention changes into a flexible form at the environmental temperature, and blocks the particles of the diverting agent 5 in the cracks 3a to thereby reliably seal the cracks 3a.

In the case of the 2-step feeding shown in FIG. 2B, on the other hand, particles of the diverting agent 5 are introduced with pressure into the cracks 3a and, thereafter, the blocking agent 7 is introduced with pressure into the fracturing fluid that is filled in the core chute 1 to thereby introduce with pressure the blocking agent 7 in the cracks 3a. Therefore, a layer of particles of the diverting agent 5 is formed in the back of the cracks 3a, a layer of the blocking agent 7 is formed so as to come in contact with the layer of particles of the diverting agent 5, particles of the diverting agent 5 are blocked at the portions where the two layers are in contact with each other, and thus the cracks 3a are effectively sealed.

Moreover, the blocking agent 7 is hydrolysable. Therefore, the blocking agent 7, too, undergoes the hydrolysis together with the diverting agent 5 and extinguishes after the passage of a predetermined period of time, enabling the resources to be effectively extracted through the cracks 3a. The blocking agent 7 does not remain under the ground and does not cause environmental contamination, either.

It can be also contrived to close the cracks 3a by using the blocking agent 7 only without using the diverting agent 5. In this case, the blocking agent 7 turns into a soft state in the cracks 3a (underground temperature is high), so cannot effectively close the cracks 3a. Namely, to effectively close the cracks 3a, it becomes necessary to use the diverting agent 5 comprising particles having a strength large enough not to be collapsed by the underground temperature.

In the foregoing was explained the function of the blocking agent 7 in the case when the diverting agent 5 was used. The blocking agent, however, can also be effectively used even when it is attempted to feed, into the cracks, a crack support material such as proppant that is used such that the cracks will not be collapsed by the underground pressure.

That is, in the hydraulic fracturing using the fracturing fluid, a granular or powdery proppant (sand or the like) of a grain size (grain size retained on sieve) of not larger than 1000 μm is used as the crack support material. As a transporting agent for transporting the crack support material into the cracks, there is favorably used the abovementioned highly crystalline hydrolysable resin such as polylactic acid in the form of a fibrous material. To block the hydrolysable fibrous material, it is also allowable to use the blocking agent of the present invention. That is, if the fibrous material used as the transporting agent is in a scattered state, the crack support material easily splits off the cracks and cannot often be fed deep into the cracks. According to the present invention that uses the above-mentioned blocking agent, the fibrous material which is the transporting agent is fixed without being scattered, so the fibrous material effectively holds the crack support material which, therefore, is fed deep into the cracks. Namely, the crack support material is fed deep into the cracks and effectively prevents the cracks from collapsing.

In this case, too, the blocking agent, after the passage of a predetermined period of time, undergoes the hydrolysis together with the fibrous material that is the transporting agent and extinguishes without, therefore, hindering the extraction of the resources through the cracks and avoiding the environmental contamination since it no longer remains under the ground.

Moreover, since the fibrous material undergoes the hydrolysis and extinguishes, the advantage of forming a channel structure in the cracks is not impaired by the use of the blocking agent.

<Blocking Agent>

In the invention, what is used as the blocking agent 7 is a material that is capable of blocking the diverting agent or the hydrolysable material such as the transporting agent that transports the crack support material at a temperature in an environment of extraction. Concretely, there is used a water-insoluble hydrolysable resin having a glass transition temperature (Tg) lower than the temperature in the environment of extraction, i.e., lower than the temperature in the ground in which the cracks are formed. By using the water-insoluble hydrolysable resin, it is allowed to feed the blocking agent 7 into the fracturing fluid while maintaining its granular form. Besides, after the passage of a certain period of time, the water-insoluble hydrolysable resin undergoes the hydrolysis and extinguishes effectively alleviating such a problem that it remains under the ground after the resources have been extracted. At the same time, the water-insoluble hydrolysable resin becomes soft at the temperature in the environment of extraction and becomes capable of blocking the hydrolysable material.

Therefore, the blocking property may be exhibited in the environment of extraction under the ground in which the cracks are formed. Or, in other words, the blocking property needs be exhibited at a temperature in the environment of extraction but needs not be exhibited on the surface of the ground. Speaking, further, the blocking property needs be exhibited in the presence of water under the ground but needs not be exhibited in a dry atmosphere under the ordinary atmospheric pressure. This is because the diverting agent and the hydrolysable material such as transporting agent for transporting the crack support material, are made present together with water that is used as the fracturing fluid being fed into under the ground.

The temperature in the ground from where the resources are extracted is, usually, about not lower than 40° C. even in the shallowest portions where the shale gas is present. It is, therefore, desired that the blocking agent has a glass transition temperature (Tg) which is lower than 60° C. That is, the blocking agent exhibits its blocking action at the time of extracting the resources present at any depth.

It is, further, desired that the hydrolysable blocking agent has a glass transition temperature (Tg) which is not lower than 40° C. This is because the hydrolysable blocking agent having too low glass transition temperature (Tg) cannot be easily granulated, and forms lumps when, for example, it is added into the fracturing fluid from the surface of the ground. Therefore, the blocking agent cannot be introduced into the cracks.

Besides, the water-insoluble hydrolysable blocking agent having the above glass transition temperature (Tg) is lowly crystalline, and has a crystallization index ΔHm of not more than 70 J/g and, specifically, not more than 30 J/g, the crystallization index ΔHm being found from a curve of temperature rise measured in the first time by using the DSC and being represented by the following formula (1), $$\Delta Hm = \Delta Hm' - \Delta Hc \quad (1)$$

wherein ΔHm' is a quantity of heat of fusion (J/g) calculated from a peak area of an endothermic peak of fusion, and ΔHc is a quantity of heat (J/g) calculated from a peak area of an exothermic peak of crystallization.

That is, the curve of temperature rise measured in the first time by using the DSC includes an endothermic peak of fusion and an exothermic peak of crystallization dependent upon the degree of crystallization. Here, the endothermic peak of fusion includes an endothermic peak due to the fusion of crystals that are formed while the temperature is being elevated. If, for example, the blocking agent is completely crystallized, there is detected no exothermic peak of crystallization. Further, if the blocking agent is not at all crystallized, quantity of heat of crystallization becomes maximal and the greatest exothermic peak is exhibited. Therefore, the greater the value of difference ΔHm between the quantity of heat of fusion ΔHM' calculated as a peak area of an endothermic peak of fusion and the quantity of heat ΔHc of crystallization calculated as a peak area of an exothermic peak of crystallization, the greater the degree of crystallization of the hydrolysable resin that is used as the blocking agent. The smaller the value of ΔHm, on the other hand, the more lowly crystalline or amorphous the hydrolysable resin is. Namely, ΔHm serves as a parameter that represents the degree of crystallization.

The fact that the hydrolysable blocking agent exhibits the above crystallization index ΔHm means that the so-called comonomers are much contained. If, for example, the crystallization index ΔHm exceeds the above-mentioned range, then the hydrolysable resin becomes so highly crystalline and hard at a temperature of the environment of extraction, and fails to work as the blocking agent.

In the invention, a copolymerized polyoxalate can be favorably used as the water-insoluble hydrolysable blocking agent that has the above-mentioned glass transition point (Tg) and the crystallization index ΔHm.

Namely, the polyoxalate is a polyester that includes an Oxalic acid ester (ester of oxalic acid and dialcohol) as a recurring unit. Here, the copolymerized polyoxalate includes an ester unit of a dibasic acid other than the oxalic acid.

In the invention, for example, the copolymerized polyoxalate favorably used as the blocking agent includes an oxalic acid ester unit represented by the following formula (2):

(2)

and a copolymerized ester unit represented by the following formula (3):

(3)

wherein R is a divalent cyclic group that contains an aromatic hydrocarbon ring or an aliphatic hydrocarbon ring.

In the copolymerized ester unit of the above formula (3), representative examples of the ring contained in the divalent cyclic group R are benzene ring, naphthalene ring and cyclohexane ring and, specifically, p-phenylene group.

It is desired that the polyoxalate includes the copolymerized ester unit at a ratio of 10 to 50 mol % and, specifically, 10 to 30 mol % to satisfy the above-mentioned glass transition temperature (Tg) and the crystallization index ΔHm.

To maintain a suitable degree of hydrolysable capability and crushability, furthermore, it is desired that the polyoxalate has a weight average molecular weight Mw in a range of 5,000 to 200,000 and, specifically, 5,000 to 100,000.

The polyoxalate having the above weight average molecular weight can be mechanically crushed at normal temperature, exhibits a suitable degree of hydrolysable capability, but does not undergo the hydrolysis even after the passage of a certain period of time and maintains its initial mass. For instance, as measured by a method described in Examples appearing later, the mass retaining ratio thereof at 55° C. after the passage of 24 hours is in a range of 20 to 50% by mass and at 70° C. after the passage of 24 hours is also in a range of 20 to 50% by mass. Therefore, the polyoxalate can be very effectively used for the extraction of the shale gas at low temperatures of not higher than 90° C. and, specifically, 40 to 80° C.

The copolymerized polyoxalate has the above-mentioned glass transition temperature (Tg) and the crystallization index ΔHm making a difference from the highly crystalline polylactic acid or the polyoxalate.

The copolymerized polyoxalate can be obtained by a known method such as a polycondensation method based on the esterification by using a dialcohol such as ethylene glycol or the like and an oxalic acid as a dibasic acid component and another dibasic acid component (e.g., $R(OH)_2$) that forms a copolymerized ester unit, or an ester-exchange method by using an ester of a dialkyl oxalate and another dibasic acid, and a dialcohol.

Here, attention should be given to that if heat-treated, the obtained copolymerized ester is so crystallized that its crystallization index ΔHm may often exceed the above-mentioned range.

Through, for example, the mechanical crushing and classification by using a sieve, the above blocking agent can be used in a granular form or a powdery form having a mesh grain size (grain size retained on sieve) of not larger than 1000 μm.

The fracturing fluid used for forming the cracks and to which the blocking agent is added, comprises chiefly water, and to which a guar gum or a chitosan is added as a thickener so that the cracks can be quickly formed by the application of pressure. Moreover, various inorganic materials or organic fibrous materials (e.g., polylactic acid fibers) can be introduced with pressure as fillers so that the cracks can be smoothly formed.

Prior to introducing the proppant with pressure, further, salts such as calcium carbonate and the like may be dispersed as a water loss-preventing agent in the fracturing fluid (water) which in this state may then be pressurized to form a cake in the wall surfaces of the ore chute. The cake works to prevent water from permeating into the ground through the wall surfaces of the ore chute and to effectively prevent the ore chute from collapsing.

In the invention, as described earlier, the blocking agent can be introduced with pressure by being mixed with the crack support materials such as diverting agent and proppant, and with an additive such as transporting agent (simultaneous feeding). Or, the blocking agent can be fed after the cracks have been formed by introducing various granular additives with pressure.

In simultaneously feeding the blocking agent, if there is used the above-mentioned highly crystalline hydrolysable resin (specifically, polyoxalate), it is desired that the content of the blocking agent is controlled to lie in a range of 5 to 50% by mass per the total amount of them so as to maintain a suitable degree of hydrolysable capability. It is, further, allowable to mix the blocking agent with various additives which are in a powdery, granular or fibrous form. Or, so far as the properties of the blocking agent and other additives can be maintained, a composition thereof may be obtained by melting and mixing these additives and the blocking agent together, and may be used by being mechanically crushed into a predetermined grain size.

Moreover, the fracturing fluid filled in the ore chute may be blended with an enzyme after, during, or prior to, the addition of the blocking agent, the enzyme working to promote the hydrolysis of various hydrolysable materials and blocking agent.

In the invention described above, the fracturing fluid is pressurized to effectively form the cracks, or the hydraulic fracturing is repeated to effectively form the cracks in a plurality of portions.

In the invention, the embodiment that uses the hydrolysable material such as polylactic acid or polyglycolic acid is desired for extracting the resources from under the ground where the temperature is a range of, particularly, 80 to 150° C. Further, use of the polyoxalate as the hydrolysable resin is desired for extracting the resources from under the ground where the temperature is 40 to 80° C. In either case, the shale gas can be very effectively extracted from under the ground where the temperature is low.

EXAMPLES

The invention will now be described by way of the following Examples.

Here, measurements in the Experimental Examples were taken by the methods described below.

<Measuring the Melting Points, Glass Transition Temperatures (Tg) and Crystallization Indexes ΔHm>

Apparatus: DSC 6220 (differential scanning calorimeter) manufactured by Seiko Instruments Inc.

Amounts of samples: 5 to 10 mg.

Measuring conditions: Nitrogen atmosphere, elevating the temperature at a rate of 10° C./min. and measuring over a range of 0° C. to 250° C.

The glass transition temperature was found from a curve of temperature rise measured in the first time by using the DSC. The melting point was found from the peak top. The crystallization index ΔHm was found from ΔHm' (J/g) measured from the area of endothermic peak of fusion and from ΔHc (J/g) measured from the area of exothermic peak of crystallization, in compliance with the following formula:

ΔHm=ΔHm'−ΔHc

<Measuring the Molecular Weights>
Apparatus: Gel permeation chromatograph GPC
Detector: Differential refractive index detector RI (Model RI-2414, sensitivity: 512, manufactured by Waters Co.)
Column: Shodex HFIP-LG (one unit), HFIP-806M (2 units), manufactured by Showa Denko K.K.
Solvent: Hexafluoroisopropanol (5 mM sodium trifluoroacetate was added)
Flow rate: 0.5 mL/min.
Column temperature: 40° C.

Five mL of a solvent was added to about 1.5 mg of a sample, and the mixture thereof was mildly stirred at room temperature (sample concentration of about 0.03%) After having confirmed with the naked eye that the sample had been dissolved, the solvent was filtered using a 0.45 μm filter (repeated twice from the weighing). All samples were measured within about one hour from the start of preparation.

<Evaluating the Hydrolysable Capability>

Powders in a total amount 300 mg and 40 ml of distilled water were put into a 50 ml polypropylene vial which was then stored still in an oven heated at 70° C. or 55° C. The samples were taken out after the passage of times (24, 48, 96, 168 hours), and the powders were dried to measure their masses. The mass retaining ratios after the passage of 24 hours were calculated as indications of hydrolysable capability.

<Evaluating the Sealability>

Powders in a total amount of 150 mg were thrown into a 250 μm pipet tip which was then stored still in an oven heated at 70° C. for one hour. The powders were compressed at the time when they were taken out. Water maintained at 55° C. was introduced into a 50 ml syringe, and to which the pipet tip filled with the powders was attached. The syringe was pressurized with a weight of 1 kg. The flow rate of water and the time were measured to evaluate the sealability on the following basis.

× (Poorly sealed): The time for flowing out 10 ml is less than 100 seconds.

○ (Favorably sealed): The time for flowing out 10 ml is not less than 100 seconds.

That is, the longer the time of flow out, the better the particles are blocked providing good sealability.

<Evaluating the Effect for Delaying the Hydrolysis>

A test was conducted for evaluating the hydrolysis at 70° C., a hydrolysis delay index was calculated according to the following formula, and the effect for delaying the hydrolysis was evaluated based on a value thereof.

Hydrolysis delay index=$T/t$ wherein,

T is a rate of hydrolysis from after 24 hours till after 48 hours, and t is a rate of hydrolysis from after 0 hour till after 24 hours.

Here, the rate of hydrolysis T from after 24 hours till after 43 hours was found from a relation, $T$=(weight after 24 hours have passed−weight after 48 hours have passed)/24

Further, the rate of hydrolysis t from after 0 hour till after 24 hours was found from a relation, $t$=(weight after 0 hours have passed−weight after 24 hours have passed)/24

The effect for delaying the hydrolysis was evaluated on the following basis.

○: The hydrolysis delay index is not less than 2 (the effect for delaying the hydrolysis is high).

Δ: The hydrolysis delay index is not less than 0.5 but is less than 2 (the effect for delaying the hydrolysis is fairy high)

X: The hydrolysis delay index is less than 0.5 (the effect for delaying the hydrolysis is low).

<Synthesis of the Polyethylene Oxalate (PEOx)>

Into a one-liter separable flask equipped with a mantle heater, a stirrer, a nitrogen introduction pipe and a cooling pipe, there were introduced:

dimethyl oxalate, 472 g (4 mol)
ethylene glycol, 297 g (4.8 mol), and
tin 2-ethylhexanoate, 0.48 ml, and the mixture thereof was polymerized under normal pressure in a nitrogen stream by elevating the temperature in the flask up to 120° C.

After the methanol started distilling off, the liquid temperature was elevated little by little up to 200° C. The polymerization was continued under normal pressure. Finally, there was obtained 260 ml of a distillate.

Thereafter, the polymerization was executed under a reduced pressure of 0.1 kPa to 0.8 kPa while maintaining the liquid temperature in the flask at 200° C.

The formed polyethylene oxalate (PEOx) was taken out, crushed by using a crusher (IMF-800DG manufactured by Iwatani Co.) so as to be granulated, and was heat-treated in vacuum at 120° C. for 2 hours to as to be crystallized.

Figure 3:
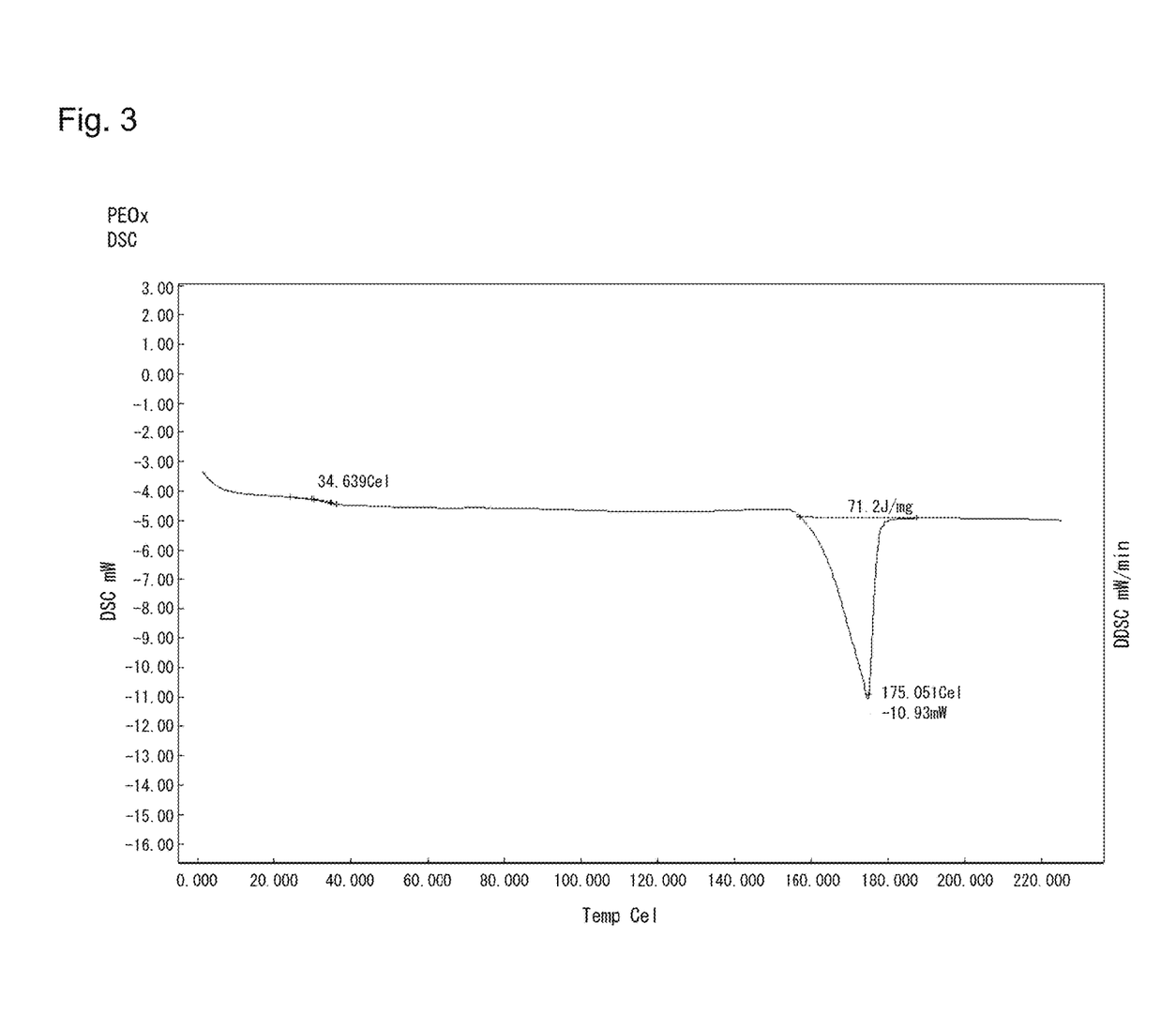
FIG. 3 shows a curve a polyethylene oxalate (PEOx) synthesized in an Experimental Example while elevating the temperature as measured in the first time by using the DSC.

Through the DSC measurement, it was found that the obtained PEOx possessed a melting point of loot, a glass transition temperature (Tg) of 35° C. and a crystallization index ΔHm of 71 J/g. FIG. 3 shows a curve while elevating the temperature measured in the first time by using the DSC.

The obtained PEOx was passed through a sieve of a perforation size of 500 μm, and the powder thereof was used for the following Examples and Comparative Examples.

<Synthesis of the Copolymerized Polyoxalate (TP20)>

Into a one-liter separable flask equipped with a mantle heater, a stirrer, a nitrogen introduction pipe and a distillation column, there were introduced:

dimethyl oxalate, 463 g (3.92 mol),
dimethyl terephthalate, 15.5 g (0.08 mol),
ethylene glycol, 297 g (4.8 mol), and
tin 2-ethylhexanoate, 0.48 ml, and the mixture thereof was polymerized under normal pressure in a nitrogen stream by elevating the temperature in the flask up to 120° C.

After the methanol started distilling off, the liquid temperature was elevated little by little up to 200° C., and the polymerization was continued under normal pressure. Finally, there was obtained 252 ml of a distillate.

Thereafter, the polymerization was executed under a reduced pressure of 0.1 kPa to 0.8 kPa while maintaining the liquid temperature in the flask at 200° C.

The formed copolymerized oxalate was taken out, and was crushed by using a crusher (IMF-800DG manufactured by Iwatani Co.) so as to be granulated.

Figure 4:
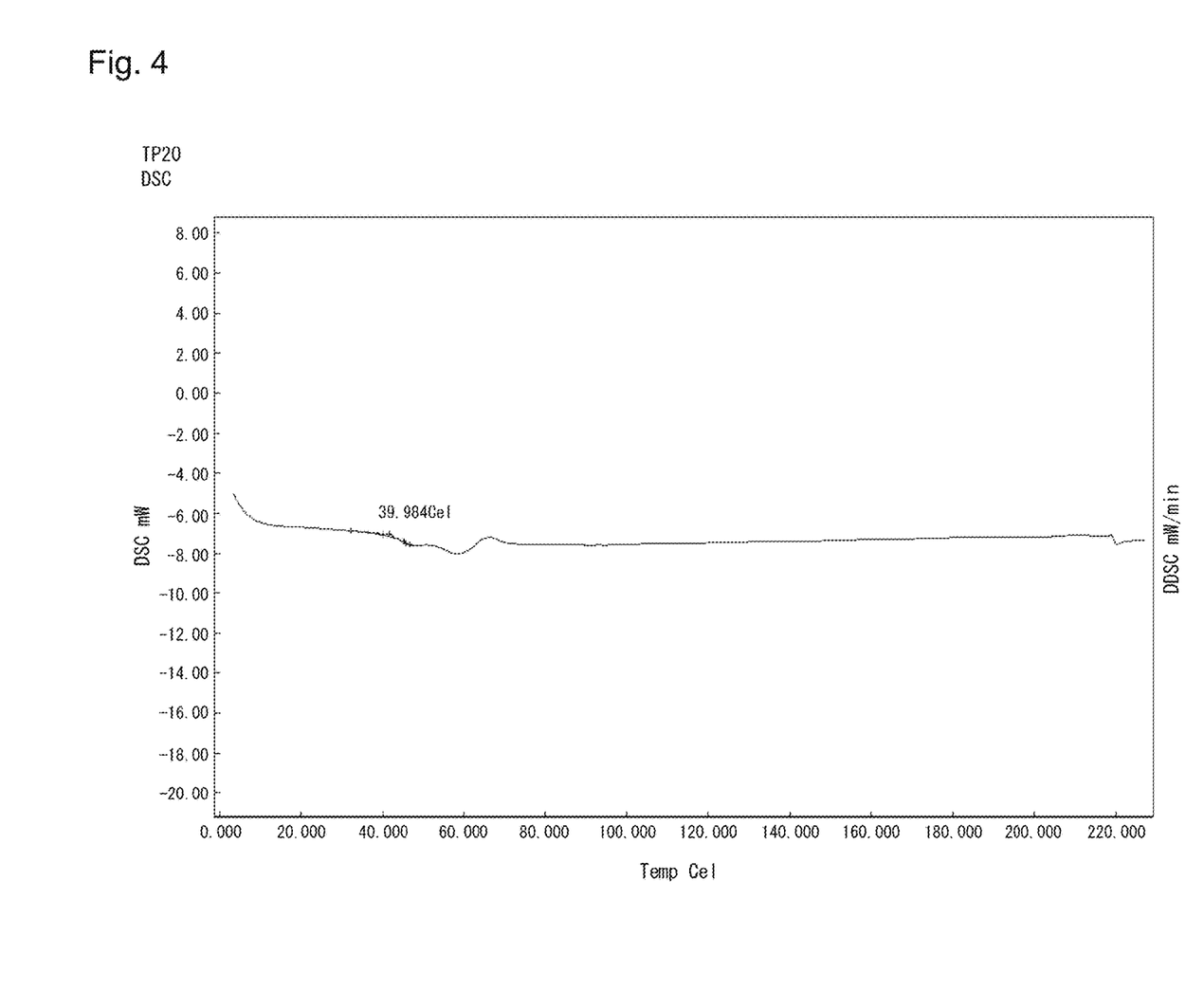
FIG. 4 shows a curve of a copolymerized polyoxalate (TP20) synthesized in an Experimental Example while elevating the temperature as measured in the first time by using the DSC.

Through the DSC measurement, it was found that the obtained copolymerized oxalate possessed a glass transition temperature (Tg) of 40° C. but exhibited no melting point. The crystallization index ΔHm thereof was 0 J/g. FIG. 4 shows a curve while elevating the temperature measured in the first time by using the DSC.

The content of the copolymerized ester unit of the obtained copolymerized oxalate (TP20) was 20 mol %. A powder of the copolymerized oxalate passed through a sieve of a perforation size of 500 μm was used for the following Examples and Comparative Examples.

The copolymerized oxalate was evaluated for its hydrolysable capability, and it was found that the mass retaining ratio thereof was 30% at 55° C. and 20% at 70° C.

Examples 1 to 3, and Comparative Examples 1 to 3

Figure 5:
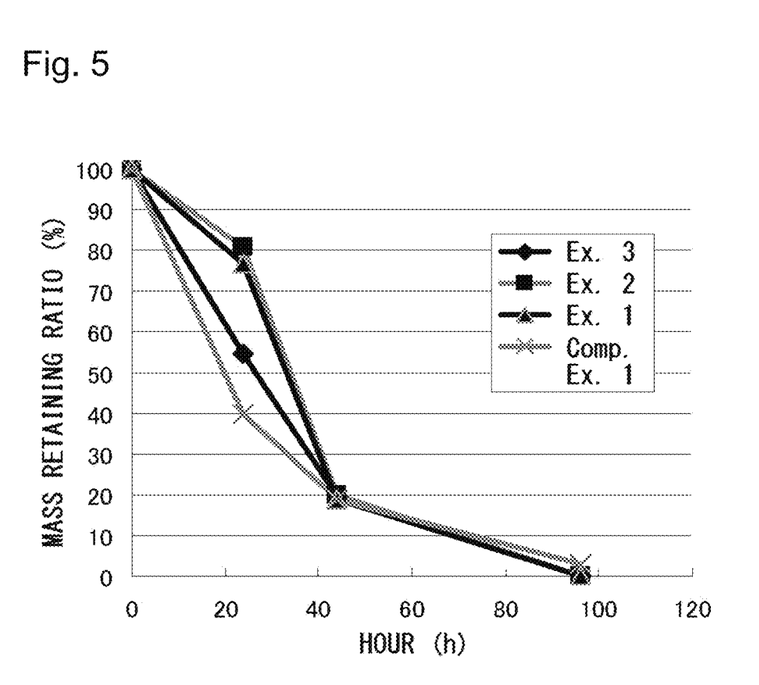
FIG. 5 is a graph showing mass-retaining ratios (%) in Examples.

The powder of the polyethylene oxalate (PEOx) synthesized above and the powder of the copolymerized oxalate (TP20) synthesized above were mixed together at such ratios that the amounts of the TP20 per the total amount of the powders were as shown in Table 1, to evaluate the hydrolysable capabilities and sealabilities. The results were as shown in Table 1. Hydrolysable capabilities were, further, evaluated as also shown in FIG. 5.

Example 4

Instead of mixing the PEOx and the TP20 together, the PEOx was, first, thrown in and, thereafter, the TP20 was thrown in, and the scalability was evaluated in the same manner as in Example 2. The result was as shown in Table 1.

TABLE 1

| | Ratio of TP20 (%) | Hydrolysable capability (55° C.) Retaining ratio after 24 hours (%) | Hydrolysable capability (70° C.) Retaining ratio after 24 hours (%) | Sealability | Effect for delaying the hydrolysis |
|---|---|---|---|---|---|
| Example 1 | 10 | 68 | 77 | ○ | ○ |
| Example 2 | 30 | 78 | 81 | ○ | ○ |
| Example 3 | 50 | 65 | 55 | | Δ |
| Example 4 | 30 | | | ○ | |
| Comp. Ex. 1 | 0 | 57 | 40 | X | X |
| Comp. Ex. 2 | 1 | | | X | |
| Comp. Ex. 3 | 5 | | | X | |

REFERENCE EXAMPLE

A mixed powder of PEOx and TP20 prepared in each of Example 1, Example 2 and Comparative Example 3 was put in an amount of 300 mg into a 50 ml polypropylene vial together with 40 ml of distilled water, and was stored still in an oven heated at 70° C. for one day. After one day has passed, the powder was taken out and was dried to evaluate its aggregating property with the naked eye.

As a result, the mixed powder was aggregated in Example 2. In Example 1 and Comparative Example 3, however, no aggregation was observed in the mixed powders.

From this fact, it is presumed that the mixed powder may not aggregate on the ground as demonstrated in Example 1. The mixed powder, however, aggregates under the conditions of an environment of extraction under the ground and exhibits favorable sealability.

DESCRIPTION OF REFERENCE NUMERALS

1: ore chute
3a, 3b: cracks
5: diverting agent
7: hydrolysis-blocking agent

The invention claimed is:

1. A method of extracting underground resources by pressurizing a fluid filled in an ore chute in which cracks are formed and by, further, forming or growing the cracks, the underground resources being extracted through the cracks, wherein a hydrolysis-blocking agent is introduced with pressure into the fluid to block a diverting agent that works to temporarily close the cracks,
wherein the hydrolysis-blocking agent is a hydrolysable resin having a glass transition temperature (Tg) lower than a temperature in an environment of extraction and a crystallization index $\Delta Hm$ of not more than 70 J/g, the crystallization index $\Delta Hm$ being found from a curve of temperature rise measured in the first time by using a DSC and being represented by the following formula (1), $$\Delta Hm = \Delta Hm' - \Delta Hc \tag{1}$$

wherein $\Delta Hm'$ is a quantity of heat of fusion (J/g) calculated from a peak area of an endothermic peak of fusion, and
$\Delta Hc$ is a quantity of heat (J/g) calculated from a peak area of an exothermic peak of crystallization.

2. The method of extraction according to claim 1, wherein the hydrolysis-blocking agent is introduced together with the diverting agent with pressure into the fluid.

3. The method of extraction according to claim 1, wherein after the cracks have been closed at least partly with the diverting agent, the hydrolysis-blocking agent is introduced with pressure into the fluid.

4. The method of extraction according to claim 1, wherein an aliphatic polyester is used as the diverting agent.

5. A hydrolysis-blocking agent to be added to a fluid that is filled in an ore chute, the hydrolysis-blocking agent having a crystallization index $\Delta Hm$ of not more than 70 J/g, the crystallization index $\Delta Hm$ being found from a curve of temperature rise measured in the first time by using a DSC and being represented by the following formula (1), $$\Delta Hm = \Delta Hm' - \Delta Hc \tag{1}$$

wherein $\Delta Hm'$ is a quantity of heat of fusion (J/g) calculated from a peak area of an endothermic peak of fusion, and
$\Delta Hc$ is a quantity of heat (J/g) calculated from a peak area of an exothermic peak of crystallization,
wherein the hydrolysis-blocking agent is a copolymerized polyoxalate in which a dibasic acid unit other than an oxalic acid has been introduced.

6. A method of extracting underground resources by pressurizing a fluid filled in an ore chute in which cracks are formed and by, further, forming or growing the cracks, the underground resources being extracted through the cracks,
wherein a hydrolysis-blocking agent is introduced with pressure into the fluid to block a diverting agent that works to temporarily close the cracks,
wherein the hydrolysis-blocking agent is a hydrolysable resin having a glass transition temperature (Tg) lower than a temperature in an environment of extraction and a crystallization index $\Delta Hm$ of not more than 70 J/g, the crystallization index $\Delta Hm$ being found from a curve of temperature rise measured in the first time by using a DSC and being represented by the following formula (1), $$\Delta Hm = \Delta Hm' - \Delta Hc \tag{1}$$

wherein $\Delta Hm'$ is a quantity of heat of fusion (J/g) calculated from a peak area of an endothermic peak of fusion, and
$\Delta Hc$ is a quantity of heat (J/g) calculated from a peak area of an exothermic peak of crystallization, and
wherein the hydrolysis-blocking agent is a copolymerized polyoxalate in which a dibasic acid unit other than an oxalic acid has been introduced.

7. The method of extraction according to claim 6, wherein the hydrolysis-blocking agent is introduced together with the diverting agent with pressure into the fluid.

8. The method of extraction according to claim 6, wherein after the cracks have been closed at least partly with the diverting agent, the hydrolysis-blocking agent is introduced with pressure into the fluid.

9. The method of extraction according to claim 6, wherein an aliphatic polyester is used as the diverting agent.

10. A method of extracting underground resources by pressurizing a fluid filled in an ore chute in which cracks are formed and by, further, forming or growing the cracks, the underground resources being extracted through the cracks,
wherein a hydrolysis-blocking agent is introduced with pressure into the fluid to block a diverting agent that works to temporarily close the cracks, and
wherein an aliphatic polyester is used as the diverting agent.

11. The method of extraction according to claim 10, wherein a hydrolysable resin having a glass transition temperature (Tg) lower than a temperature in an environment of extraction is used as the hydrolysis-blocking agent.

12. The method of extraction according to claim 11, wherein the hydrolysable resin used as the hydrolysis-blocking agent has a glass transition temperature (Tg) lower than a temperature in an environment of extraction and a crystallization index $\Delta Hm$ of not more than 70 J/g, the crystallization index $\Delta Hm$ being found from a curve of temperature rise measured in the first time by using a DSC and being represented by the following formula (1), $$\Delta Hm = \Delta Hm' - \Delta Hc \tag{1}$$

wherein $\Delta Hm'$ is a quantity of heat of fusion (J/g) calculated from a peak area of an endothermic peak of fusion, and $\Delta Hc$ is a quantity of heat (J/g) calculated from a peak area of an exothermic peak of crystallization.

13. The method of extraction according to claim 12, wherein the hydrolysis-blocking agent is a copolymerized polyoxalate in which a dibasic acid unit other than an oxalic acid has been introduced.

14. The method of extraction according to claim 10, wherein the hydrolysis-blocking agent is introduced together with the diverting agent with pressure into the fluid.

15. The method of extraction according to claim 10, wherein after the cracks have been closed at least partly with the diverting agent, the hydrolysis-blocking agent is introduced with pressure into the fluid.

* * * * *